UNITED STATES PATENT OFFICE.

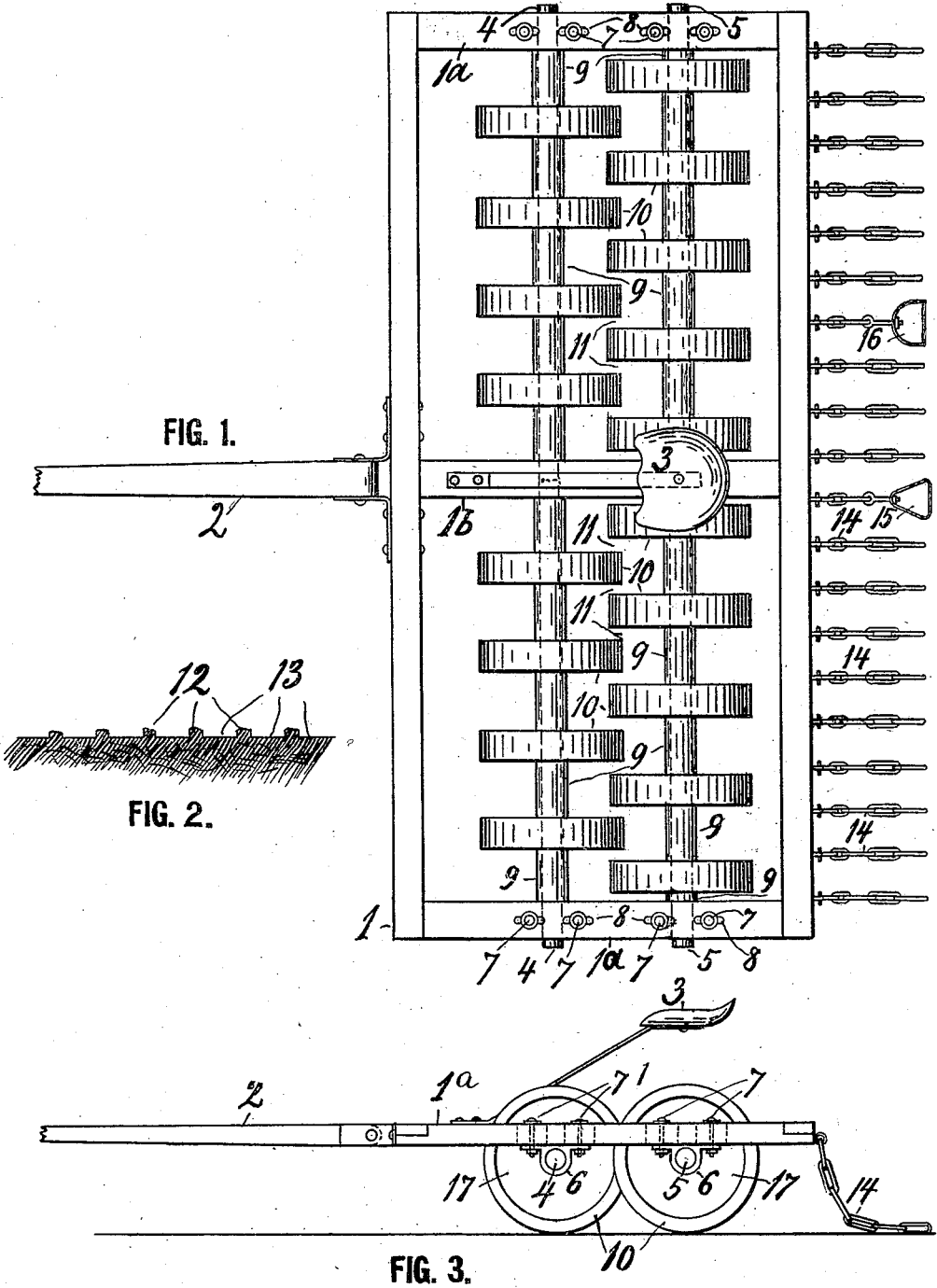

SWAN P. WALGREN, OF WORTHINGTON, MINNESOTA.

LAND-ROLLER.

No. 880,608.    Specification of Letters Patent.    Patented March 3, 1908.

Application filed April 18, 1907. Serial No. 368,870.

*To all whom it may concern:*

Be it known that I, SWAN P. WALGREN, a subject of the King of Sweden, who has declared his intention to become a citizen of the United States, residing at Worthington, in the county of Nobles and State of Minnesota, have invented a new and useful Land-Roller, of which the following is a specification.

My invention relates to agricultural implements, and the object is to provide a new and efficient ground roller, by which dry land may be rolled so hard that a crust is formed on it to protect the moisture below the surface and to prevent the soil and seed therein from getting blown away by the wind. This and other objects I attain by the novel construction and arrangement of parts illustrated in the accompanying drawing, in which—

Figure 1 is a top or plan view of my ground roller. Fig. 2 gives an idea of the track the rollers of the machine make upon a field it moves over. Fig. 3 is a side elevation of the machine.

Referring to the drawing by reference numerals, 1 designates a yoke-shaped frame having a draft pole 2 and a driver's seat 3. To the side bars 1$^a$ and a central longitudinal bar 1$^b$ are journaled parallel shafts 4 and 5, whose bearings 6 are held by bolts 7 passing through wide slots 8 in the frame, so that by moving the bearings the shafts may be adjusted to and from each other and the bearings may also be moved slightly inward on the shafts sufficiently to take up wear of the end of the sleeves 9 revolving on the shaft nearest the end of it. The shafts are filled up with such sleeves, which form the hubs of the wheels or rollers 10, which are thus arranged alternately on the front and rear shaft with some intervening space 11, whereby the ridges 12 in Fig. 2, are formed upon the field while the surface 13 between the ridges is rolled down to form a crust. This is done either while the soil is moist from rain or new plowing and harrowing, or from the dew and dampness of the night found in the morning.

At the rear of the frame are suspended drag chains 14, preferably provided at the free ends with a ring or triangle or other enlarged member indicated at 15 and 16, by which the ridges 12 are partly spread upon the spaces 13, preparatory to seeding wheat or other grain or seed, which is then covered or mixed with the earth in the usual manner. The ground now presents a crusty surface with moisture preserved so close below it that it benefits the seed sown in and between the ridges. The roller may also be applied again after the seeding is done, or only after the plowing, harrowing and seeding are completed.

The hubs 9 of the roller wheels 10 may revolve on the shaft or they may be fixed thereon and have only the shafts revolving in the bearings, or both. And the shafts may each be a single shaft extending across the entire frame, or each may be divided into two sections, each journaled to one of the side bars and to the center bar 1$^b$ of the frame.

In Fig. 2 the rollers are shown as having solid web 17, but when so desired spokes may be used.

Having thus described my invention, what I claim, and desire to secure by Letters Patent, is:—

1. In a machine of the class described, the combination with a frame and means for drawing the same, of two parallel shafts extending from side to side of the frame one rearward of the other, a series of roller wheels on each shaft with intervening spaces between the wheels, the spaces between the wheels on one shaft being wider than the faces of the wheels of the other shaft so as to leave unrolled ridges on the ground, and chains dragged by the rear end of the frame in line with said ridges.

2. In a machine of the class described, the combination with a frame and means for drawing the same, of two parallel shafts extending from side to side of the frame one rearward of the other, a series of roller wheels on each shaft with intervening spaces between the wheels, the spaces between the wheels on one shaft being wider than the faces of the wheels of the other shaft, so as to leave unrolled ridges on the ground, and chains dragged by the rear end of the frame in line with said ridges, and enlarged members at the lower ends of the chains.

In testimony whereof I affix my signature, in presence of two witnesses.

SWAN P. WALGREN.

Witnesses:
C. M. CORY,
HARRY R. TRIPP.